United States Patent
Lindquist et al.

(10) Patent No.: US 9,961,097 B2
(45) Date of Patent: *May 1, 2018

(54) SYSTEM FOR REMOTE ACCESS OF A USER PREMISES

(71) Applicant: Portus Singapore Pte Ltd, Sydney (AU)

(72) Inventors: Charles Cameron Lindquist, Sydney (AU); Timothy John Lindquist, Waverton (AU)

(73) Assignee: Portus Singapore Pte Ltd, Sydney (AU)

( * ) Notice: Subject to any disclaimer, the term of this patent is extended or adjusted under 35 U.S.C. 154(b) by 215 days.

This patent is subject to a terminal disclaimer.

(21) Appl. No.: 14/536,784

(22) Filed: Nov. 10, 2014

(65) Prior Publication Data

US 2015/0088983 A1    Mar. 26, 2015

Related U.S. Application Data

(63) Continuation of application No. 09/868,417, filed as application No. PCT/AU99/01128 on Dec. 17, 1999, now Pat. No. 8,914,526.

(30) Foreign Application Priority Data

Dec. 17, 1998    (AU) .......................... PP7764

(51) Int. Cl.
*G06F 15/16*       (2006.01)
*H04L 29/06*      (2006.01)
(Continued)

(52) U.S. Cl.
CPC .......... *H04L 63/1425* (2013.01); *G08B 25/10* (2013.01); *H04L 12/4641* (2013.01);
(Continued)

(58) Field of Classification Search
CPC ..... G08B 25/10; H04L 12/4641; H04L 12/66; H04L 63/0272; H04L 63/083;
(Continued)

(56) References Cited

U.S. PATENT DOCUMENTS 4,370,675 A    1/1983    Cohn
4,962,473 A   10/1990    Crain
(Continued)

FOREIGN PATENT DOCUMENTS

EP    0 822 473 A2    2/1998
EP    0 825 506 A2    2/1998
(Continued)

OTHER PUBLICATIONS

Lawton G., "Dawn of the Internet Appliance," Computer, IEEE Computer Society, Long Beach, CA, US, vol. 30, No. 10, Oct. 1, 1997 (Oct. 1, 1997), pp. 16,18, XP000738076 ISSN: 0018-9162.
(Continued)

*Primary Examiner* — Christopher Biagini
(74) *Attorney, Agent, or Firm* — Panitch Schwarze Belisario & Nadel LLP (57) ABSTRACT

A home security and control system for monitoring and controlling an external environment such as a home environment comprising: an Internet browser connectable to an extranet; an extranet located external to the home environment and accessible via the Internet browser; a communications server located in the extranet and adapted to interconnect on demand with one of a series of connection gateways located in predetermined home environments; and a connection gateway located in the home environment adapted to control and/or monitor the operation of at least one security device in the home environment; wherein upon accessing a predetermined address by the Internet browser on the extranet, the communications server connects to a (Continued)

predetermined one of the connection gateways to control and/or monitor the operation of the security device. The extranet can ideally be implemented as a Virtual Private Network (VPN) across an Internet substrate.

26 Claims, 6 Drawing Sheets

(51) Int. Cl.
*H04M 11/04* (2006.01)
*H04L 29/08* (2006.01)
*G08B 25/10* (2006.01)
*H04L 12/46* (2006.01)
*H04L 12/66* (2006.01)

(52) U.S. Cl.
CPC .............. *H04L 12/66* (2013.01); *H04L 29/06* (2013.01); *H04L 63/0272* (2013.01); *H04L 63/083* (2013.01); *H04L 67/025* (2013.01); *H04L 67/10* (2013.01); *H04L 67/12* (2013.01); *H04L 67/14* (2013.01); *H04M 11/04* (2013.01); *H04L 69/329* (2013.01)

(58) Field of Classification Search
CPC ... H04L 63/1425; H04L 67/025; H04L 67/12; H04L 67/14
See application file for complete search history.

(56) References Cited

U.S. PATENT DOCUMENTS

| | | | |
|---|---|---|---|
| 5,497,430 A | 3/1996 | Sadovnik et al. | |
| 5,546,943 A | 8/1996 | Gould | |
| 5,557,742 A | 9/1996 | Smaha et al. | |
| 5,591,299 A | 1/1997 | Seaton et al. | |
| 5,621,662 A | 4/1997 | Humphries et al. | |
| 5,649,014 A | 7/1997 | Koopman, Jr. et al. | |
| 5,668,929 A | 9/1997 | Foster, Jr. | |
| 5,692,124 A | 11/1997 | Holden et al. | |
| 5,701,451 A * | 12/1997 | Rogers ................ G06F 17/3089 | |
| 5,717,379 A | 2/1998 | Peters | |
| 5,751,956 A | 5/1998 | Kirsch | |
| 5,784,463 A | 7/1998 | Chen et al. | |
| 5,784,564 A | 7/1998 | Camaisa et al. | |
| 5,809,311 A | 9/1998 | Jones | |
| 5,892,758 A | 4/1999 | Argyroudis | |
| 5,917,405 A | 6/1999 | Joao | |
| 5,940,074 A | 8/1999 | Britt, Jr. et al. | |
| 5,948,059 A | 9/1999 | Woo et al. | |
| 5,956,487 A | 9/1999 | Venkatraman et al. | |
| 5,958,016 A | 9/1999 | Chang et al. | |
| 5,961,594 A | 10/1999 | Bouvier et al. | |
| 5,991,881 A | 11/1999 | Conklin et al. | |
| 6,014,746 A | 1/2000 | Krehnke et al. | |
| 6,023,724 A | 2/2000 | Bhatia et al. | |
| 6,032,202 A | 2/2000 | Lea et al. | |
| 6,044,349 A | 3/2000 | Tolopka et al. | |
| 6,052,723 A | 4/2000 | Ginn | |
| 6,061,650 A * | 5/2000 | Malkin ................. H04L 63/083 370/401 |
| 6,070,244 A | 5/2000 | Orchier et al. | |
| 6,088,330 A | 7/2000 | Bruck et al. | |
| 6,108,300 A | 8/2000 | Coile et al. | |
| 6,141,339 A | 10/2000 | Kaplan et al. | |
| 6,144,859 A | 11/2000 | LaDue | |
| 6,178,433 B1 | 1/2001 | Nakamura et al. | |
| 6,185,316 B1 | 2/2001 | Buffam | |
| 6,192,403 B1 | 2/2001 | Jong et al. | |
| 6,195,680 B1 | 2/2001 | Goldszmidt et al. | |
| 6,216,173 B1 | 4/2001 | Jones et al. | |
| 6,243,596 B1 | 6/2001 | Kikinis | |
| 6,271,752 B1 * | 8/2001 | Vaios ................ G08B 13/19608 340/525 |
| 6,408,330 B1 | 6/2002 | DeLaHuerga | |
| 6,433,801 B1 | 8/2002 | Moon et al. | |
| 6,453,348 B1 * | 9/2002 | Barnier ................... H04L 29/06 709/200 |
| 6,496,862 B1 | 12/2002 | Akatsu et al. | |
| 6,930,709 B1 * | 8/2005 | Creamer ............ H04N 1/00214 348/207.1 |
| 7,007,104 B1 | 2/2006 | Lewis et al. | |
| 7,145,898 B1 | 12/2006 | Elliott | |
| 7,151,758 B2 | 12/2006 | Kumaki et al. | |
| 2005/0248444 A1 | 11/2005 | Joao | |
| 2006/0203809 A1 | 9/2006 | Khuc | |
| 2007/0106792 A1 | 5/2007 | Blumenau | |

FOREIGN PATENT DOCUMENTS

| | | |
|---|---|---|
| EP | 0 838 768 A2 | 4/1998 |
| GB | 2 316 841 A | 3/1998 |
| WO | WO-9424803 A1 | 10/1994 |
| WO | WO-95/22087 A1 | 8/1995 |
| WO | WO-98/19445 A1 | 5/1998 |
| WO | WO-98/50865 A1 | 11/1998 |
| WO | WO-98/53581 A1 | 11/1998 |

OTHER PUBLICATIONS

Peisel B., "Designing the Next Step in Internet Appliances," Electronic Design, Penton Publishing, Cleveland, OH, US, vol. 46, No. 7, Mar. 23, 1998 (Mar. 23, 1998), pp. 50,52,56, XP000780455 ISSN: 0013-4872.

Desbonnet J., et al., "System Architecture and Implementation of a CEBus/Internet Gateway," IEEE Transactions on Consumer Electronics, IEEE Inc. New York, US, vol. 43, No. 4, Nov. 1997 (Nov. 1997), pp. 1057-1062, XP000768558 ISSN: 0098-3063.

* cited by examiner

SYSTEM FOR REMOTE ACCESS OF A USER PREMISES

RELATED APPLICATION INFORMATION

The present application is a continuation application of U.S. patent application Ser. No. 09/868,417, filed on Oct. 23, 2001, which is a national phase of International Application No. PCT/AU99/01128, filed Dec. 17, 1999, and which claims priority to Australian Patent Application No. PP 7764, filed on Dec. 17, 1998, the contents of each of which are hereby incorporated herein by reference in their entireties.

FIELD OF THE INVENTION

The present invention relates to the area of local and remote monitoring and control, through use of a standard web browser and the Internet

BACKGROUND OF THE INVENTION

A communication node between data and a telecommunication networks is disclosed in PCT Patent Publication Number WO 94/24803 which describes a node that enables communication between users using different types of terminals, such as telephones and computers.

PCT Patent Publication Number WO 98/19445 describes a service node between Internet networks and a telecommunications network that is used to order telephony services by means of HTML pages from a computer with a WWW browser. It also describes a method of calling a subscriber, in which the call is ordered by computer but the connection is set up between the telephones of a first and second subscriber. The service node communicates with computers connected to computer networks using the HTTP protocol. The node stores data related to a subscriber; said data can be used when the user requests a telephony service.

A system for the control of devices within the home, using web browsers, is described in "Browser-style interfaces to a home automation network", IEEE Transactions on Consumer Electronics Volume 43 4, D. Corcoran, J. Desbonnet.

The automation and security systems that may be installed in a user's premises are becoming more and more advanced. Users often have a common need to control and monitor such systems both locally and remotely. Typically these systems provide an on-site control panel offering input facilities and visual status display facilities, but generally must resort to non-visual monitoring and control mechanisms for remote operation. Remote operation is usually achieved by telephone through codes entered via a telephone handset. Some systems allow both local and remote operation using any combination of voice command input and voice feedback of status. Due to the complexity of the automation systems and the choices they afford users, such remote systems are cumbersome and limit the scope for interaction. In addition, the user must learn several alternate methods of control.

Another problem with current systems is the absence of a monitoring and control method that provides a geographically independent standard interface that is universally accessible and not platform or hardware dependant. Corcoran describes the use of a web browser and the WWW for a standard interface, both local and remote, in "Browser-style interfaces to a home automation network", IEEE Transactions on Consumer Electronics Volume 43 4. However it is assumed in that paper that for remote monitoring and control, the site to be controlled is actively connected to the Internet at the time that remote operation is desired. In the case that the site is not actively connected to the Internet, a user may initiate a connection from their remote location to the desired site manually. However, this requires special knowledge and telecommunications access facilities on the part of the user and is not a suitable mechanism for those individuals who are not technically literate.

Another problem with current systems, and with the system described by Corcoran, is that if the user is geographically remote to the user premises, then initiating a direct connection through the public telecommunication network is expensive, requiring a long distance or international call.

Another problem with current systems relates to the handling of alarm and surveillance data. Current systems are based on CCTV and VCR technology. A problem associated with such systems is that surveillance data remains unprotected whilst retained at the site of an incursion.

Another problem with current systems relates to the cost associated with the surveillance system. System costs for video surveillance may be prohibitive, as they are based on CCTV and VCR technology. In addition, steps must be taken to ensure that surveillance data remains protected if it must be retained at the site of an incursion. Methods employed to make such systems tamper-proof add to the total system cost.

Another problem associated with current surveillance systems is that they may not differentiate alarm and non-alarm conditions, and continuously record activity. Such systems record in a loop fashion, eventually overwriting prerecorded material.

Another problem with current systems is that they do not allow, except in the case of expensive systems, a remote user, or remote authorised security personnel, to interrogate a surveillance or automation system during an alarm condition.

Another problem with existing systems is that they do not provide a facility for viewing surveillance material in relation to a user premises during non-alarm periods using standard platform independent and location independent mechanisms.

SUMMARY OF THE INVENTION

In accordance with a first aspect of the present invention, there is provided a home security and control system for monitoring and controlling an external environment such as a home environment comprising: an Internet browser connectable to an extranet; an extranet located external to the home environment and accessible via the Internet browser; a communications server located in the extranet and adapted to interconnect on demand with one of a series of connection gateways located in predetermined home environments; and a connection gateway located in the home environment adapted to control and/or monitor the operation of at least one security device in the home environment; wherein upon accessing a predetermined address by the Internet browser, the communications server connects to a predetermined one of the connection gateways to control and/or monitor the operation of the security device. The extranet can ideally be implemented as an Virtual Private Network (VPN) across an Internet substrate.

Preferably, when a customer connects to their home, their home effectively appears to them as a website, with all devices, security and otherwise, accessible for monitoring or control.

In accordance with a further aspect of the present invention, there is provided a home security system for monitoring a home environment comprising: an extranet located external to the home environment; storage means forming part of the extranet; at least one communications server located in the extranet and adapted to interconnect on demand with one of a series of connection gateways located in predetermined home environments; a connection gateway located in the home environment adapted to control and/or monitor the operation of at least one security device in the home environment; and a security device activating a security condition upon the occurrence of a predetermined event; wherein, upon the occurrence of the predetermined event, the security device notifies the connection gateway and transfers event information on the predetermined event to the connection gateway and the connection gateway establishes an interconnection with the communications server and transfers the event information via the communications server to the storage means for later interrogation by a user of the home security system.

Ideally, the storage means operates virtually in that it is allocated dynamically o a server in accordance with usage demands.

Ideally, the communication server utilises a telecommunications network to interconnect with the connection gateway. The security device preferably can include or respond to alert conditions which are preferably forwarded to the connection gateway, wherein it can be qualified with a pre-programmed enable, and if the result can be TRUE, an alarm event can be generated, whereupon the connection gateway establishes a connection with one of the communications servers, and surveillance data related to the alarm event can be uploaded to the extranet for secure storage accessible upon interrogation by a user. In a further refinement, the enables can be across zones or device types so as to simultaneously arm multiple security devices.

In one example, the extranet forms part of the Internet and the communications server can be located within the local telephone call radius of the home environment, thus providing lowest cost PSTN access from or to the home environment. Other types of access may be provided (e.g. ADSL or ISDN interconnection).

In a further preferred modification, photos of authorised occupants of the home environment are preferably accessible from the extranet and are accessed upon an alarm event and cross referenced with surveillance data to ascertain whether a true alarm condition has been raised. The accessibility to surveillance data can be controlled by the user.

The system preferably requires user authentication to access the extranet by users, with the authentication being provided only once per Internet browser session. The system uses web page technology and can be implemented in, for example, the following manner: a) directly in HTML, b) directly in XML, c) XML parsed through style sheet to format supported by users browser (HTML, WAP, VRML, . . . ), d) scripting languages (e.g. Java). The accessible URL provided for each user of the home security system provides details of the current status of the home environment of the user. The Internet browser can be utilised in conjunction with an Internet access device which can include a smart card reader and associated user smart card which provides authentication details and a URL corresponding to the home environment. The smart card also ideally facilitates global access to the Internet for access of the extranet, and optionally additionally tracks connections for expensing. The Internet access device can be a computer, WebPhone, Portable digital assistant, or mobile phone or any other device with web browsing capability.

In one embodiment, the smart card can include an on-board bio-sensor. Hence the smart card consists of a data receptacle and substrate, with the substrate including a biosensor on the surface. An embedded controller reads biosensor and processes input data using a stored identification algorithm. The substrate can also include an embedded communication means and means of accepting power for operation, either through direct electrical connection or magnetic/rf coupling. The authentication data can be bound to an individuals "fingerprint" during a registration process. Through utilizing an on-board biosensor, sensor devices are not required everywhere, only on the one card.

The extranet can be extended to other uses including providing a user premises e-mail facility and other facilities, for example downloading of standard news data etc. The connection gateway can further incorporate a user programmed answer strategy, including delayed answer, and optionally detection of a voice connection and recording compressed message, thus operating in answering machine mode. After accepting the transmitted voice, fax, or data, upon completion of inbound call the connection gateway, can raise a connection to a communications server, and send an indication to the user of the home security system of the receipt of a recorded data. The connection gateway can further send a recorded compressed voice messages to a communications server for storage on the extranet for forwarding to a user of the home environment. The connection gateway also provides an indication of messages received on a HTML page accessible by a user of the home environment. In one embodiment, the connection gateway acts as a hub and Internet connection mechanism for connected devices including the security devices located in the home environment. That is, the gateway acts as a router, so if a URL is entered which is external to home it automatically raises the connection to Internet.

The connection gateway is ideally in a tamper proof enclosure and can operate without mains power such that, upon tampering, the connection gateway triggers an alarm and relays the alarm to the extranet.

The system can also include a control terminal interconnected to the connection gateway, the control terminal comprising a wall mounted flat panel display incorporating a touch screen and running web browser. The control terminal can use wireless protocols such as TCP/IP running over wireless standards such as Bluetooth. The control terminal can be equipped with biosensor such as a fingerprint sensor, for access authentication of a local user in the home environment to the connection gateway. Alternatively, other forms of secure authentication can be provided. The control terminal can be connected to the connection gateway in a wireless manner and can be powered by rechargeable batteries, allowing the control terminal mobility within the range of wireless transmitters attached to the user premises network. Ideally, the control terminal can be of reduced handheld size, so that can operate as universal premises remote control.

Ideally, the control terminal integrates a digital camera, microphone and speaker, and H323 protocol software, thus allowing the control terminal to be used as a videophone, through a standard browser interface. Alternatively, the control terminal can be provided by a personal computer (PC) equipped with a user premises network connection, wherein the PC runs a browser accessing a URL corresponding to the connection gateway. Alternatively, the control terminal can be provided by set top box connected to TV and running a web browser. The control terminal can be equipped with a smartcard reader for e-commerce transactions over the extranet.

At least one of the security devices can comprise a digital security camera embodying image capture and compression method and an interconnection to the connection gateway running a protocol such as the H323 protocol standard. The camera could alternatively take JPEG stills, motion JPEG, or digital video. The camera preferably can include motion detection and image significance algorithms which run in the camera, and filter input so that only detected motion input can be compressed and sent through the connection gateway to the extranet.

The connection gateway can be programmable to allow different response mechanisms to differing classes of alert event. Preferably, the connection gateway contains connection details for preferred and secondary communication servers on the extranet, so that if a first communication server does not respond, other communication servers may be contacted until successful connection can be achieved. The extranet preferably can include a user contact database which preferably can include preferred contact methods, allowing automatic contact mechanisms to be associated with alarm condition, including use of e-mail, pager, computer generated voice message through telephone, requesting response or if timeout, security action.

The user data storage on the extranet for storing event data associated with the home environment can be allocated virtually and allocated redundantly, ensuring integrity of stored surveillance data.

The security devices preferably can include an external access mechanism to the user premises. Also one of the security devices can be equipped with reader for an RF tag that can be used for user authentication or equipped with a smartcard reader that can be used for user authentication.

Preferably, the connection gateway provides support for standards such as the HomePnP standard for CEBus networks, OSGI, Bluetooth, the HAVi standard for consumer appliance control etc.

In one example access mechanism, the smartcard preferably can include a biosensor bonded to the substrate of the smart card, and circuit embedded in smartcard to authenticate user before the smartcard will operate.

In accordance with a further aspect of the present invention, there is provided a system for providing information access across at least two networks, the system comprising a first network having a first network access controller; a second network having a second network access controller; and a user access browser located on the first network for locating and examining information on the first and second networks by means of network address locators; wherein when a predetermined location on the network is accessed, the first network access controller initiates the establishment of a network connection to the second network access controller so as to provide for the temporary interconnection of the first network to the second network, the system thereby providing a seamless access to information stored on the second network from the user access browser.

BRIEF DESCRIPTION OF THE DRAWINGS

Preferred embodiments of the present invention will now be described with reference to the accompanying drawings in which.

DESCRIPTION OF PREFERRED AND OTHER THE EMBODIMENTS

The preferred embodiments provide a method of remote control that provides the user visual monitoring and control information. The preferred embodiment also provides a visual interface for both remote and local monitoring and control. The preferred embodiment simplifies the use, for a user, of automation and security services in relation to their designated premises. It also simplifies monitoring of the user's premises by an authorised security service. It achieves this simplification of use by providing an integrated facility for monitoring and control, alarm detection and transmission, and alarm servicing, that is accessible both locally and remotely through a standard web browser via secure user-specific HTML pages. Of course other protocols such as WAP, VRML or XML can also be utilised.

Figure 1:
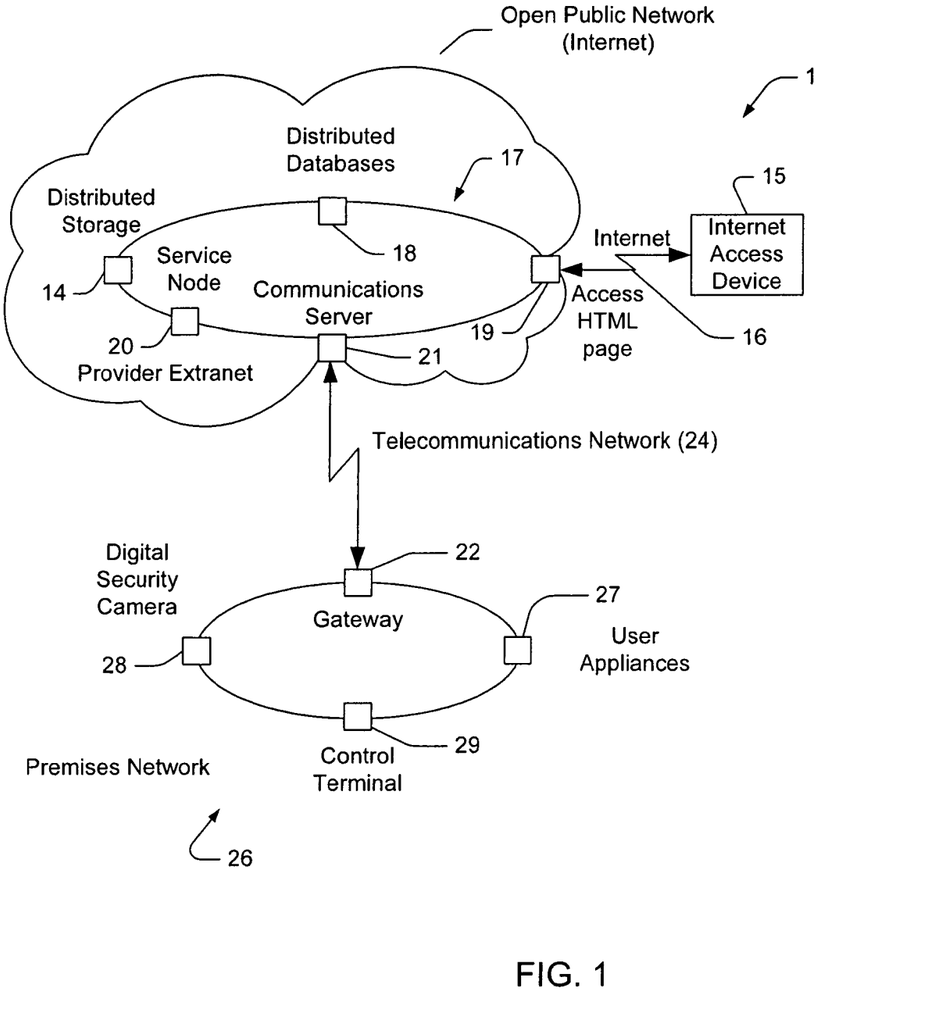
FIG. 1 illustrates the arrangement of the preferred embodiment.

Turning now to FIG. 1, there is illustrated the arrangement of the preferred embodiment which includes the following components:

An Internet access device 15, which may include, but is not limited to, a computer, a mobile phone with display, a Web Phone, or a Personal Digital Assistant, capable of connection to the World Wide Web (WWW) through a client web browser supporting the HyperText Transfer Protocol (HTTP).

A web browser interface which runs on the Internet access device 15 and that allows the user to access, through queries over the WWW, HTML pages from HTTP servers corresponding to associated URLs.

An active Internet connection that connects the Internet access device 15 to the Internet 16.

A virtual private network (VPN) 17, termed here the "provider network", which is connected to the Internet and which embodies a collection of Internet-accessible resources that implement part of the integrated monitoring and control, alarm transmission and servicing functions of the invention. This network 17, whilst accessible from the Internet, forms an Extranet.

An extranet is a private network that uses the Internet protocols and the public telecommunication system to securely share part of a business's information or operations with suppliers, vendors, partners, customers, or other businesses. An extranet can be viewed as part of a company's intranet that is extended to users outside the company. An extranet requires security and privacy. These require firewall server management, the issuance and use of digital certificates or similar means of user authentication, encryption of messages, and the use of virtual private networks (VPNs) that tunnel through the public network.

A virtual private network (VPN) is a private data network that makes use of the public telecommunication infrastructure, maintaining privacy through the use of a tunnelling protocol and security procedures. A virtual private network can be contrasted with a system of owned or leased lines that can only be used by one company. The idea of the VPN is to give the company the same capabilities at much lower cost by sharing the public infrastructure. Using a virtual private network involves encrypting data before sending it through the public network and decrypting it at the receiving end. An additional level of security involves encrypting not only the data but also the originating and receiving network addresses.

The resources associated with the provider VPN 17 network include:

- An authentication system or database 18 containing access information in relation to authorised users.
- A user connection system or database 14 containing connection parameters in relation to the user premises.
- A login facility 19 to initiate a secure connection for authorised users of Internet access devices 15. User specific HTML (or other standard) pages which are stored on logon facility server 19 and are linked to private areas, and possibly public areas.
- A service node 20 which uses the user connection parameters to direct a communications server 21 to establish a connection through either a private or public telecommunications network to a gateway 22 at the user premises.
- A communications server 21.
- A telecommunications network 24.
- A user premises gateway 22 including a web server running on the user premises gateway 22.
- A home network 26 attached to the gateway 22, which may include sub nets of differing physical implementation.
- Appliances 27 attached to the home network which may be monitored and controlled by gateway 27 and include specific intrusion detection devices which may instigate alarms.
- A surveillance device 28 in the form of a digital security camera or other form of intrusion detection such as motion detection etc.
- A control terminal 29.

The following situations for operation of the preferred embodiment are identified:

1. The user is in a remote location with respect to their premises and wishes to monitor and control, or retrieve recorded data associated with, their premises;
2. The user is local to their premises and wishes to monitor and control their premises;
3. An alarm condition is reported to the monitoring network, and surveillance data recorded.

1. Remote Operation

The user premises network 26 is normally in an unconnected state in relation to the provider network 17. Specific actions on the part of the remote user, or their authorised agents, connect the user premises network to the provider network, thus allowing monitoring and control operations to proceed.

Each user registered with the provider network has login data and premises connection data stored respectively in user login and user connection systems or databases 18 located within the provider network. In addition, private Web pages are provided for each user, allowing access to URLs dedicated to either of two resource classes. One resource class is dedicated to stored surveillance data, whilst the other resource class is dedicated to active connection to the user premises for monitoring and control.

A remote user, who desires to monitor or control their premises, uses a web browser on an Internet access device 15 to view the private HTML pages that are dedicated to monitoring and control of the user premises by entering a URL associated with the HTML page they wish to access.

Before the remote user may view the particular HTML pages that are associated with the monitoring and control of the user premises, they must first identify themselves to the provider network via a login procedure associated with the HTML pages in question. Once the user's identification details, constituting a user name and password are authenticated, the user is permitted access to the HTML page requested.

Once the user authentication process is complete, the records associated with the user, detailing connection parameters for the user premises, are retrieved from a database 18 in the provider network. The process of accessing the URL dedicated to the monitoring and control of the user premises initiates a sequence of events that culminate in connection of the user premises network 26 to the provider network 17. A service node 20 within the provider network intercepts the access to the URL dedicated to the monitoring and control of the user premises, and uses the premises connection data associated with the user to instruct a communications server 21 to initiate a connection to the gateway 22 at the user premises The communications server 21 at the service node interprets the user connection parameters and initiates a connection phase across the telecommunications facility to connect with the gateway 22 at the customer premises. The telecommunications facility 24 includes any system that allows end to end communication, including but not limited to the PSTN, PLMN, ISDN and RF communication.

Preferably, a gateway 22 at the user premises has a dedicated port to the telecommunications network. However, it is possible for the gateway to share the port to the telecommunications network, in which case the user may connect to the gateway using a number of different response mechanisms, including a delayed answer mechanism.

The gateway answers the incoming call and completes the connection. The gateway and the connection server negotiate connection parameters and establish a network connection between the user premises network and the provider network. A web server on the gateway then accepts HTTP protocol through the connection. The service node 20 forwards the URL that was previously intercepted and that corresponds to a resource contained within the customer premises network to the gateway.

Figure 2:
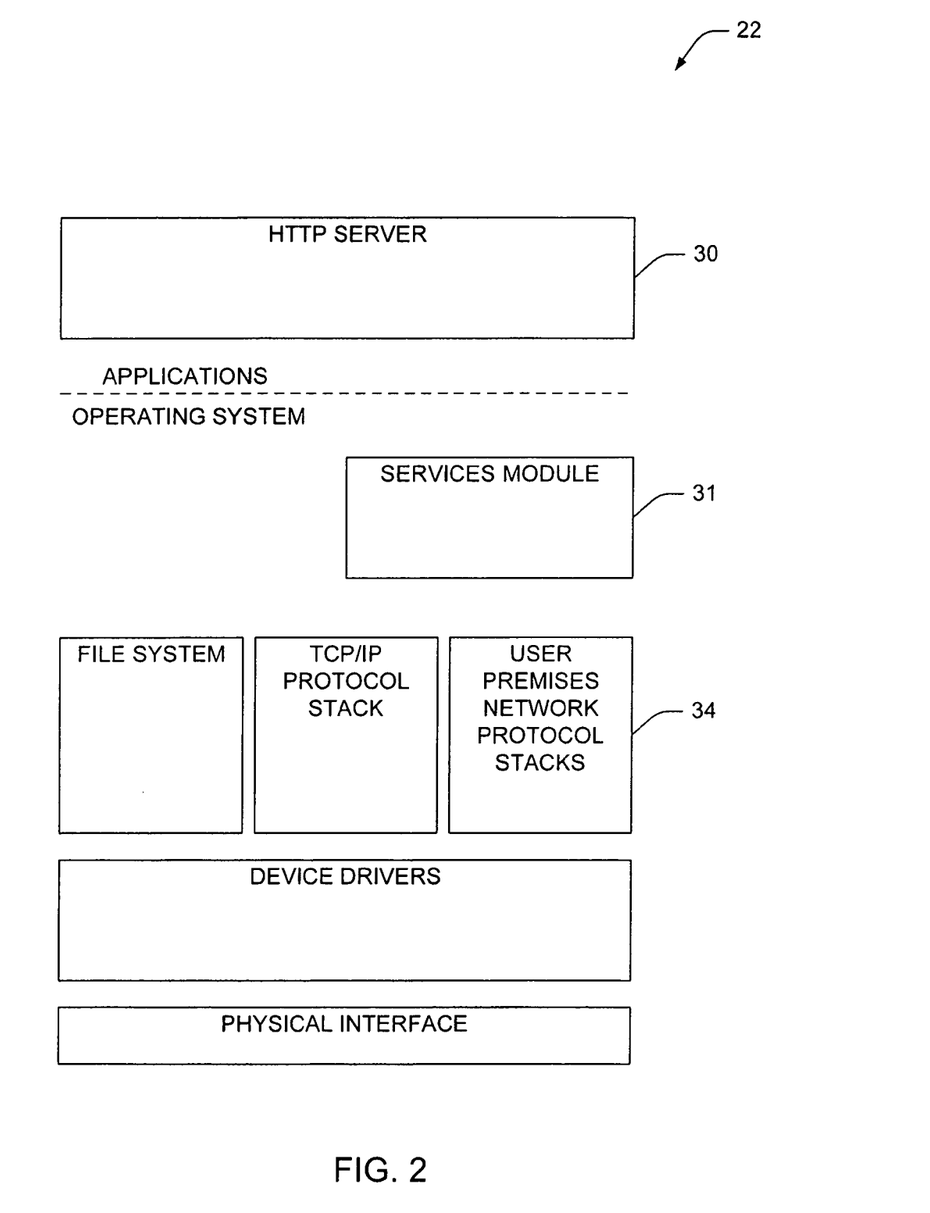
FIG. 2 illustrates the software modules of a gateway.

Turning now to FIG. 2 there is illustrated the components running on the gateway computer 22 in more detail. The computer includes a HTTP server 30 which runs as an application. The gateway web server 30 then serves information in relation to user premises appliances through appropriate web pages to the user. The gateway web server communicates with a Services Module 31, which allows the control and monitoring actions to be performed, and issues requests to the Services Module 31 to fulfil the user requests. The requests are relayed through the protocol stack 34 attached to the operating system resident in the gateway to the target appliances attached to the network. Data is sent or received from the device in response to the requests. In the case of control actions, the device performs the action, whilst in the case of monitoring actions, the device returns the requested data.

Figure 3:
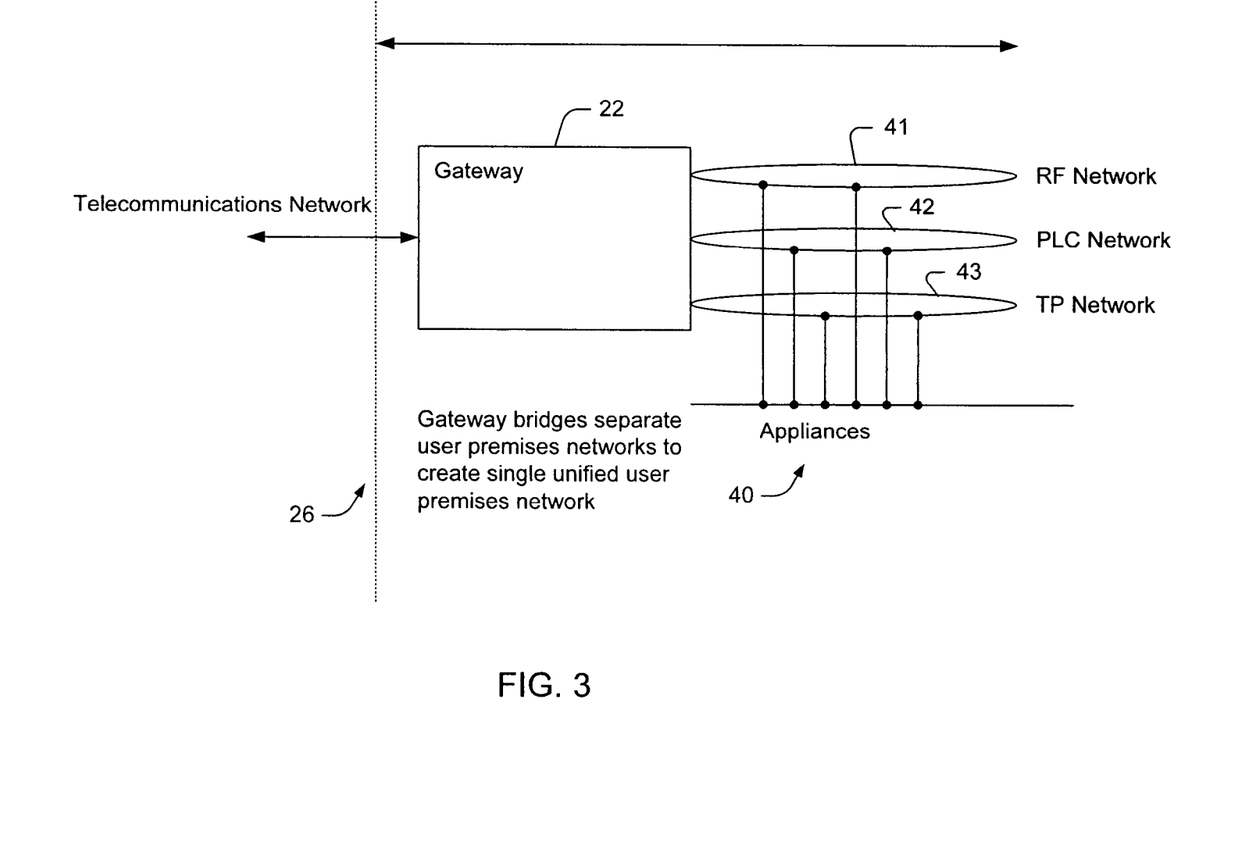
FIG. 3 illustrates a gateway attached to a series of appliance via different networks.
Figure 4:
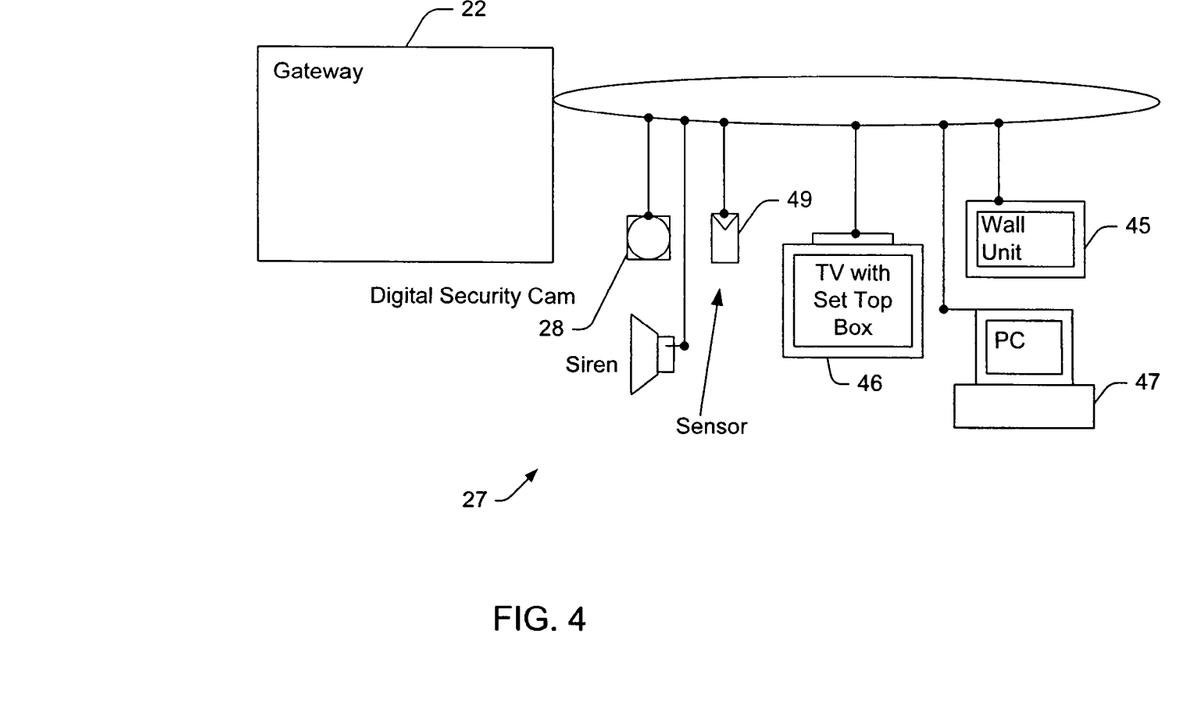
FIG. 4 illustrates a gateway attached to a series of appliances.

As illustrated in FIG. 3, the gateway can be interconnected to a series of appliances 40 over a number of different networks 41, 42, 43. FIG. 4 illustrates one form of hardwired interconnection with a series of appliances 27.

User Access Master Node Website

1. From web browser, user initiates connection to login facility http server 19 via its domain name server (DNS) address.

2. DNS address is translated to associated IP address of login facility 19 by a DNS server.
3. HTTP connection request is sent to IP address of login facility 19.
4. HTTP request is received by login facility 19 HTTP server and ACK is replied
5. Page request is sent to HTTP service node 20.
6. HTTP service node 20 determines availability of requested document
7. HTTP service node 20 responds with response code.
8. HTTP transaction occurs User Logs In
1. User access login page at login facility 19.
2. User is prompted for authentication details
3. User supplies authentication details
4. HTTP login facility 19 receives authentication details (potentially via SSL 40 bit secure connection)
5. HTTP login facility 19 decodes details and consults authentication database 18.
6. Database 18 verifies user authentication and notifies login facility.
7. If successful, user profile/identifier is pulled from database 18.
8. Two concurrent processes are initiated on service node 20 (P1 to keep the user informed, the P2 to establish the connection via communications server 21 to the monitored premises
9. P1 Personalised web page is dynamically constructed and sent to user's browser requesting wait
10. P2 Connection profile is used to initiate request to gateway 22 by either of 3 possible scenarios Scenario 1: Service Node 20, Login Facility 19 and Connection Establishment Server 21 are Co-resident at Same Network Node
1. A response request is sent to an interface on the connection server 21 which initiates connection (dialup) to remote host 22.
2. Connection is established using connection profile for automatic authentication at remote side.
3. Remote web server gateway is queried for active HTTP services
4. If successful user HTTP connection is redirected to remote HTTP service on gateway 22.
5. If non-successful the user is notified and alert raised to monitoring personnel monitoring extranet 17.

Scenario 2: Service Node 20 and Connection Establishment Service 21 are at Separate Nodes, Connection is Identified by Static Addressing
1. A response request is sent to communications server 21 which also holds subnet routing entry for static IP address.
2. Response is delivered to communications server 21 via intermediate gateways using appropriate routing protocol
3. Request for response is delivered to appropriate interface on communications server 21, which may initiate remote connection via entries within gateway configuration tables
4. Wait state is established until positive response from gateway 22 bound with specified IP address
5. Response (either positive or negative) is received from communications server 21.
6. Response is relayed to login facility 18.
7. If successful user HTTP connection is redirected to remote HTTP service on gateway 22.
8. If non-successful user is notified and alert raised to monitoring personnel Scenario 3: Service Node 20 and Connection Establishment Server 21 are at Separate Nodes, and Connection must Establish Identity via Dynamically Assigned Addressing Case 1: Dynamic Assignment is Achieved by Reconfiguration of End Point Router Interface Configuration Tables Service Node 20.
1. A control channel is established to the end-point gateway 22 as specified in the connection profile
2. The end point gateway 22 is programmed with the IP address specified in the connection profile (the IP address may be obtained dynamically by the service node 20 server from any dynamic host configuration service), and with the connection details required to establish physical connection via OSI level 1 network.
3. Request for response is sent to IP address specified in connection profile of device e.g. 27-29 via end point gateway 22.
4. Request for response is delivered to appropriately reconfigured interface.
5. Response (either positive or negative) is received from interface of device 27-29.
6. Response is relayed to Gateway 22.
7. If successful user HTTP connection is redirected to remote HTTP service on gateway 22.
8. If non-successful user is notified and alert raised to monitoring personnel Case 2: Dynamic Assignment is Achieved by Request for IP Address Assignment from Dynamic Host Configuration Service (Local to End-Point Router) Initiated by Endpoint Router Based on Connection Parameter (from the Connection Profile) Encapsulated in the Request Packet Received from the Server Node 20.
1. Service Node 20 encapsulates connection parameters from connection profile in request packet which is sent to communications server 21.
2. Communications server 21 detects request packet received from service node 20.
3. Communications server 21 detects queries DHC server with connection parameters.
4. DHC server dynamically assigns IP address for connection profile to endpoint gateway
5. Endpoint router reconfigures interface using connection parameters and IP address
6. Request for response is delivered to appropriately reconfigured interface.
7. Response (either positive or negative) is received from interface.
8. Response is relayed to Gateway Web/Auth Service
9. If successful user HTTP connection is redirected to remote HTTP service
10. If non-successful user is notified and alert raised to monitoring personnel For all dynamic IP address assignment methods, the allocated IP address is relayed to the home gateway once the interface is successfully raised (There are several methods. For instance, PPP can be used to negotiate the IP address to be assigned to the Home Gateway) Immediately that the interface with the assigned IP address on the Home Gateway is raised a watchdog process will bind an instance of the HTTP service to the raised interface for service of request corning through to that interface.

2. Local Operation

A local user can monitor and control devices and appliances in the user premises through a control terminal incorporating a display and an input mechanism and running a web browser. The control terminal can be implemented as a wall mounted display unit 45, a set top box and TV 46, or a PC 47, which runs a web browser. The user accesses HTML pages on the gateway 22 which provide monitoring and control services for devices located within the user premises that are attached to the premises network.

The gateway web server serves information through HTML pages to the user. The gateway web server communicates with a Services Module, which allows the control and monitoring actions to be performed, and issues requests to the Services Module to fulfil the user requests. The requests are relayed through the protocol stack attached to the operating system resident in the gateway to the target appliances attached to the network. Data is sent or received from the device is response to the requests. In the case of control actions, the device performs the action, whilst in the case of monitoring actions, the device returns the requested data. The gateway can also acts as a router, so if non-local address is detected, gateway can raise connection so that non-local IP address can be accessed across Internet.

3. Alarm Operation

Devices, such as sensors 49, attached to the user premises network may generate alert conditions, in response to a condition detected by a device sensor or to a particular device state. A special case identified is an alert condition generated by an intrusion detection or surveillance device.

Figure 5:
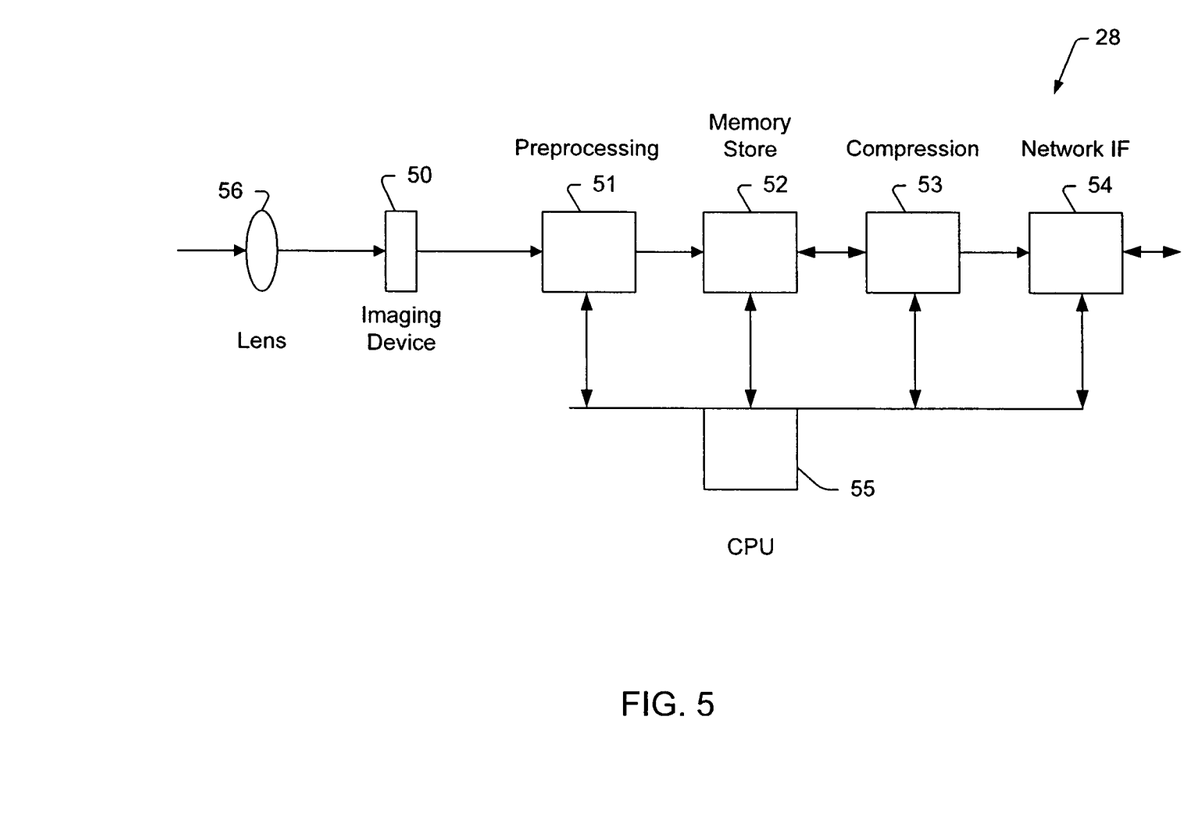
FIG. 5 illustrates schematically the structure of a first camera system.

A digital security camera 28 is provided and, as shown in more detail in FIG. 5, incorporates an imaging device 50 for capturing an image from lens 56, preprocessing unit 51, memory store 52, compression unit 53, network interface 54 and CPU 55. The digital security camera is connected to the user premises network gateway through a physical or wireless network. The gateway 22 and the camera system 28 communicate through a common protocol. The imaging device 51 within the digital security camera continuously records image data, which is then read from the imaging device, through the pre-processing circuit 51, and written to memory store 52. A compressor 53 reads image data from memory and produces a compressed version of the image data. The CPU 55 may optionally analyse the raw image using motion detection and image significance algorithms programmed into the CPU. If the security system is armed, and a significant event is detected, an alert condition is generated and compressed images and other information are transmitted through the network interface 54, across the user premises network, to the gateway 22.

Figure 6:
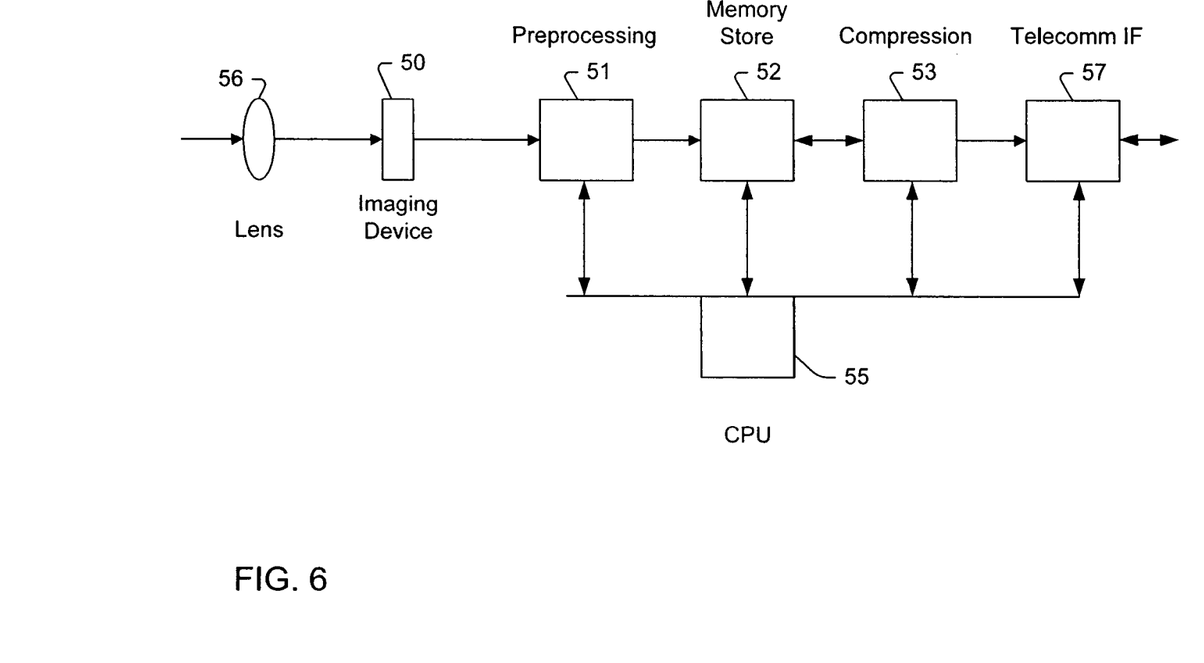
FIG. 6 illustrates schematically the structure of a second camera system.

In another embodiment of the security camera, as shown in FIG. 6, the functionality of the gateway is incorporated directly into the camera and a telecommunications interface 57 is provided for direct connection with the communications server.

Returning to FIG. 1, generally, once an alert condition is detected by a sensor or other device attached to the user premises network, information regarding the alert condition is transmitted via the user premises network 26 to the gateway 22. Software on the gateway interprets the information in relation to the alert condition, and may qualify the alert condition with user pre-programmed qualifiers stored in a database on the gateway 22. An alarm condition is generated if the logical AND of the alert condition and corresponding qualifier is TRUE. In response to an alarm condition, the gateway 22 uses pre-programmed connection parameters to initiate a connection through the telecommunications network 24 to a preferred communications server 21 on the provider network 17. The communications server answers the call and completes the connection. If there is a fault and a successful connection to the communications server can not be raised, the gateway may retrieve from a local database further connection details for alternative communication servers on the provider network. Once a successful connection exists between the gateway and a communication server on the provider network, the gateway and the communication server negotiate connection parameters and establish a connection between the user premises network 26 and the provider network. This process identifies the user premises network, and hence the associated user, to the provider network 17. Information in relation to the alarm condition is transmitted from the user premises network 26 to the provider network 17. Software running on the provider network processes the alarm condition, and transmits an alarm state to a monitoring console. In addition, pre-programmed alarm actions in relation to the user are retrieved from a user database 18 on the provider network, and all actions identified are automatically performed. These may include automatic notification of the alarm condition to the user through mechanisms such as, but not limited to: e-mail, pager, and telephone. In addition, all data associated with the alarm condition transmitted from the user premises network to the provider network is stored in a secure repository within the provider network. User pre-programmed qualifiers may gate access to this recorded surveillance data by authorised monitoring personnel. The data is accessible to the user in their private storage area, and may be viewed from their web browser.

Further modifications and applications are possible. For example, the connection gateways could form nodes of a distributed computing environment that may be allocated by the extranet on a demand basis to facilitiate supercomputer type calculations.

It would be appreciated by a person skilled in the art that numerous variations and/or modifications may be made to the present invention as shown in the preferred embodiment without departing from the spirit or scope of the invention as broadly described. The preferred embodiment is, therefore, to be considered in all respects to be illustrative and not restrictive.

The invention claimed is:

1. A system for remote access of a user premises comprising:
   a first hardware processing circuitry running an access browser module;
   a second hardware processing circuitry located in a first network; and
   a connection gateway that is located in, and is part of a local network of, the user premises;
   wherein:
   the second hardware processing circuitry is external to the user premises, is accessible via the access browser module, and is configured to communicate on-demand with the connection gateway;
   the connection gateway is integrated with or communicatively coupled to one or more networked components of the local network of the user premises; and
   the system is configured such that user-input of a Uniform Resource Locator (URL), in accordance with which the first hardware processing circuitry, using the access browser module, accesses an address on the first network, begins a sequence in which the second hardware processing circuitry responsively serves to the first hardware processing circuitry, via the access browser module, information regarding at least one of the one or more networked components of the local network, which information the second hardware processing circuitry obtains from the connection gateway without a direct communicative coupling between the second hardware processing circuitry and the at least one networked component of the local network, wherein the sequence includes the first hardware processing circuitry transmitting to the second hardware processing circuitry authentication data indicating authority to access the at least one networked component of the local network, the transmission of the authentication data being required for the serving of the information to the first hardware processing circuitry, and wherein:

the user premises is one of a plurality of user premises;

the connection gateway is one of a plurality of connection gateways, each of which is located in, and is part of a respective local network of, a respective one of the plurality of user premises, and to each of which the second hardware processing circuitry is configured to connect; and the sequence further including the second hardware processing circuitry determining which one of the local networks the authentication data indicates authority to access, the sequence further including the second hardware processing circuitry establishing a new communication session between the first hardware processing circuitry and the connection gateway of the respective local network that the authentication data indicates authority to access upon verification of the authentication data, and wherein the second hardware processing circuitry receives, via the connection gateway, selected information from at least one of the networked components of the local network of the user premises, and stores the selected information in the first network for subsequent review by a user associated with the user premises, without requiring the user to provide the authentication data, and wherein the authority to access the at least one networked component of the local network by transmitting the authentication data also provides authority to access and review the previously stored selected information in the first network via the access browser module.

2. The system of claim 1, wherein the access browser module is an Internet browser.

3. The system of claim 1, wherein the first network is an extranet.

4. The system of claim 1, wherein the second hardware processing circuitry is configured to interconnect on-demand with the connection gateway.

5. The system of claim 1, wherein the second hardware processing circuitry is not communicatively coupleable to the at least one networked component of the local network.

6. The system of claim 1, wherein the second hardware processing circuitry stores information identifying a plurality of users, information identifying respective ones of the plurality of user premises which respective ones of the users are permitted to access, and, for each of the connection gateways, respective connection information for communicating with the respective connection gateway.

7. The system of claim 1, wherein the second hardware processing circuitry performs dynamic webpage generation in the sequence, which begins in response to the user-input of the URL, the dynamic webpage generation being personalized according to the authentication data.

8. The system of claim 1, wherein the second hardware processing circuitry obtains the information from the connection gateway via the new communications session.

9. The system of claim 1, wherein the URL identifies the address.

10. The system of claim 1, wherein the second hardware processing circuitry includes a plurality of components distributed in the first network.

11. The system of claim 1, wherein the first hardware processing circuitry is external to the user premises.

12. The system of claim 1, wherein the second hardware processing circuitry controls and provides network access between (a) the at least one networked component of the local network and (b) components that are external to the local network.

13. The system of claim 1, wherein accessing of the at least one networked component of the local network using the second hardware processing circuitry is possible only by interaction with information served by the connection gateway.

14. The system of claim 1, wherein accessing of the at least one networked component of the local network using the second hardware processing circuitry is possible only by interaction with a web-based data served by the connection gateway.

15. The system of claim 1, wherein the first hardware processing circuitry is embodied in a mobile device.

16. The system of claim 1, wherein the information is presented as a webpage by the access browser module.

17. The system of claim 1 wherein the accessing includes at least one of controlling and monitoring one or more of the networked components.

18. The system of claim 1 wherein the selected information is event information captured by one of the networked components as a result of the occurrence of a predetermined event detected by one of the networked components.

19. A system for remote access of a user premises comprising:

a first hardware processing circuitry including a user interface;

a second hardware processing circuitry located in a first network; and a connection gateway that is located in, and is part of a local network of, the user premises;

wherein:

the second hardware processing circuitry is external to the user premises, is accessible by the first hardware processing circuitry, and is configured to communicate on-demand with the connection gateway;

the connection gateway is integrated with or communicatively coupled to one or more networked components of the local network of the user premises; and the system is configured such that user-input of a Uniform Resource Locator (URL) using the user interface, in accordance with which the first hardware processing circuitry accesses an address on the first network, begins a sequence in which the second hardware processing circuitry responsively serves to the first hardware processing circuitry, for display using the user interface, information regarding at least one of the one or more networked components of the local network, which information the second hardware processing circuitry obtains from the connection gateway without a direct communicative coupling between the second hardware processing circuitry and the at least one networked component of the local network,
wherein the sequence includes the first hardware processing circuitry transmitting to the second hardware processing circuitry authentication data indicating authority to access the at least one networked component of the local network, the transmission of the authentication data being required for the serving of the information to the first hardware processing circuitry, and wherein:
the user premises is one of a plurality of user premises;
the connection gateway is one of a plurality of connection gateways, each of which is located in, and is part of a respective local network of, a respective one of the plurality of user premises, and to each of which the second hardware processing circuitry is configured to connect; and
the sequence further including the second hardware processing circuitry determining which one of the local networks the authentication data indicates authority to access,
the sequence further including the second hardware processing circuitry establishing a new communication session between the first hardware processing circuitry and the connection gateway of the respective local network that the authentication data indicates authority to access upon verification of the authentication data, and
wherein the second hardware processing circuitry receives, via the connection gateway, selected information from at least one of the networked components of the local network of the user premises, and stores the selected information in the first network for subsequent review by a user associated with the user premises, without requiring the user to provide the authentication data, and
wherein the authority to access the at least one networked component of the local network by transmitting the authentication data also provides authority to access and review the previously stored selected information in the first network via the user interface.

20. The system of claim 19 wherein the accessing includes at least one of controlling and monitoring one or more of the networked components.

21. The system of claim 19 wherein the selected information is event information captured by one of the networked components as a result of the occurrence of a predetermined event detected by one of the networked components.

22. The system of claim 19, wherein the first network is an extranet.

23. A system for remote access of a user premises comprising:
a first hardware processing circuitry running an access browser module;
a second hardware processing circuitry located in a first network; and
a connection gateway that is located in, and is part of a local network of, the user premises;
wherein:
the second hardware processing circuitry is external to the user premises, is accessible via the access browser module, and is configured to communicate on-demand with the connection gateway;
the connection gateway is integrated with or communicatively coupled to one or more networked components of the local network of the user premises; and
the system is configured such that user-input of a Uniform Resource Locator (URL), in accordance with which the first hardware processing circuitry, using the access browser module, accesses an address on the first network, begins a sequence in which the second hardware processing circuitry responsively serves to the first hardware processing circuitry, via the access browser module, information regarding at least one of the one or more networked component of the local network and presented by the access browser module, via interaction with which presentation, at the first hardware processing circuitry, the at least one networked component is controllable (a) through a communication session established between the second hardware processing circuitry and the connection gateway and (b) without a direct communicative coupling between the second hardware processing circuitry and the at least one networked component,
wherein the sequence includes the first hardware processing circuitry transmitting to the second hardware processing circuitry authentication data indicating authority to access the at least one networked component of the local network, the transmission of the authentication data being required for the serving of the information to the first hardware processing circuitry, and wherein:
the user premises is one of a plurality of user premises;
the connection gateway is one of a plurality of connection gateways, each of which is located in, and is part of a respective local network of, a respective one of the plurality of user premises, and to each of which the second hardware processing circuitry is configured to connect; and
the sequence further including the second hardware processing circuitry determining which one of the local networks the authentication data indicates authority to access,
the sequence further including the second hardware processing circuitry establishing a new communication session between the first hardware processing circuitry and the connection gateway of the respective local network that the authentication data indicates authority to access upon verification of the authentication data, and
wherein the second hardware processing circuitry receives, via the connection gateway, selected information from at least one of the networked components of the local network of the user premises, and stores the selected information in the first network for subsequent review by a user associated with the user premises, without requiring the user to provide the authentication data, and
wherein the authority to access the at least one networked component of the local network by transmitting the authentication data also provides authority to access and review the previously stored selected information in the first network via the access browser module.

24. The system of claim 23 wherein the accessing includes at least one of controlling and monitoring one or more of the networked components.

25. The system of claim 23 wherein the selected information is event information captured by one of the networked components as a result of the occurrence of a predetermined event detected by one of the networked components.

26. The system of claim 23, wherein the first network is an extranet.

\* \* \* \* \*